United States Patent

[11] 3,603,180

| [72] | Inventor | L. Bruce Alexander |
| | | San Marino, Calif. |
| [21] | Appl. No. | 846,483 |
| [22] | Filed | July 31, 1969 |
| [45] | Patented | Sept. 7, 1971 |
| [73] | Assignee | Threadline Fastener Corporation |
| | | Covina, Calif. |

[54] INSTALLATION TOOL FOR THREADED INSERT
1 Claim, 6 Drawing Figs.

| [52] | U.S. Cl. | 81/53.2 |
| [51] | Int. Cl. | B25b 13/50 |
| [50] | Field of Search | 81/53.2 |

[56] References Cited
UNITED STATES PATENTS

| 3,368,430 | 2/1968 | Levering | 81/53.2 |
| 2,704,473 | 3/1955 | Walther | 81/53.2 |
| 2,458,622 | 1/1949 | Miller | 81/53.2 |
| 2,800,820 | 7/1957 | Retterath | 81/53.2 |

Primary Examiner—James L. Jones, Jr.
Attorney—Lyon & Lyon

ABSTRACT: A tool for installing a threaded insert into a workpiece is provided with a screw member threadedly mounted in a shank member. A portion of the screw member projects through an end surface of the shank member for engagement with internal threads in the insert. Cooperating lugs on the members provide an angular lost-motion connection between them.

PATENTED SEP 7 1971

3,603,180

INVENTOR
L. BRUCE ALEXANDER
BY
Lyon & Lyon
ATTORNEYS

INSTALLATION TOOL FOR THREADED INSERT

This invention relates to apparatus for installing a threaded bushing or "insert" into a workpiece. As an example, steel inserts provided with coaxial internal and external threads are commonly mounted in a body or workpiece formed of lightweight material such as an aluminum alloy. The purpose is to provide a hard wear-resistant internally threaded opening in a workpiece for releasable connection to a threaded fastener such as a capscrew. If the fastener were to be threaded directly into the soft metal of the workpiece, the wear caused by repeating threading and unthreading of the fastener into the workpiece would lead to premature failure.

A problem of installation of the threaded insert arises when the insert is flush or installed below the surface of the workpiece. If a conventional externally threaded and shouldered tool is employed for installing such a threaded insert, it may be difficult to remove the tool after the insert reaches the desired position in the workpiece, because reverse turning of the tool may result in withdrawal of the insert from the workpiece. The same problem exists when the insert is of the self-locking variety.

It is an important object of this invention to provide an installation tool for threaded inserts which tool automatically disconnects itself from the threaded insert upon reverse-turning movement, so that no difficulty is encountered upon removing the tool from the installed threaded insert. Other and more detailed objects and advantages will appear hereinafter. In the drawings.

Figure 6:
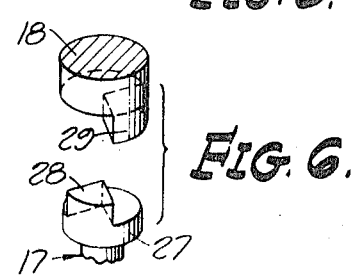

FIG. 6 is an exploded perspective view partly broken away showing positions of the cooperating lugs of the installation tool. Referring to the drawings, the workpiece 10 is provided with an internally threaded opening 11. The threaded insert 12 is provided with external threads 13 and coaxial internal threads 14. The external threads 13 are formed to cooperate with the internally threaded opening 11 in the workpiece 10. If desired, the insert 12 may include a soft plug 12a to provide a self-locking action.

In accordance with this invention, an installation tool generally designated 15 comprises a shank member 16 and a screw member 17. The shank member 16 includes a bar 18 fixed to a coaxial shell 19 by means of a crosspin 20. The parts 18, 19 and 20 are fixed together and function as a single unit. The bar 18 and shell 19 cooperate to form a cavity 21 within the shank member 16. An internally threaded bore 22 extends axially from the cavity 21 through the end surface 23 of the shell 19. The screw member 17 is received in the threaded bore 22 and a portion thereof projects beyond the end surface 23. The external threads 24 on the screw member engage the threaded bore 22 and also engage the internal threads 14 on the insert 12.

Figure 1:
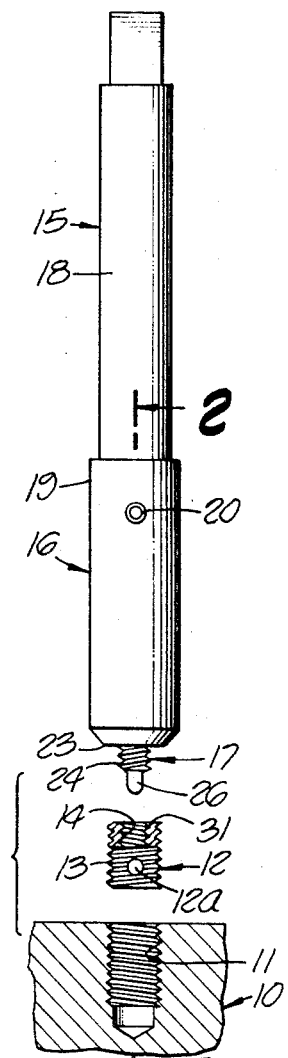
FIG. 1 is an exploded view partly broken away, showing a threaded opening in a workpiece, a threaded insert to be received in the opening, and an installation tool comprising a preferred embodiment of this invention.
Figure 2:
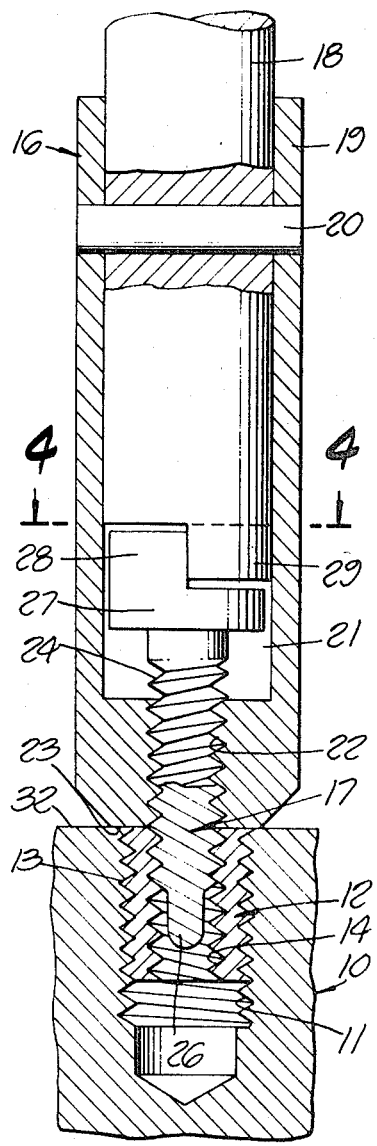
FIG. 2 is a sectional view taken substantially on the lines 2—2 of FIG. 1 and showing the threaded insert installed in position in the workpiece.
Figure 3:
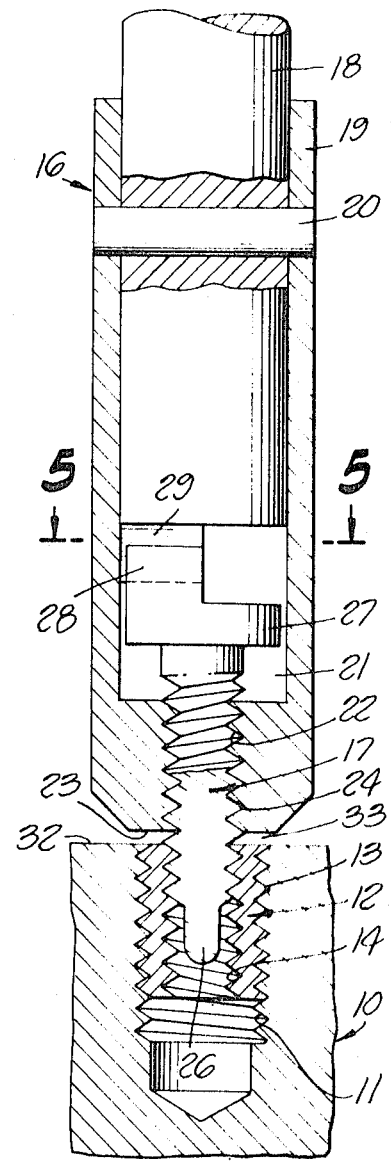
FIG. 3 is a view similar to FIG. 2 but showing the parts of the installation tool in a different position.
Figure 4:
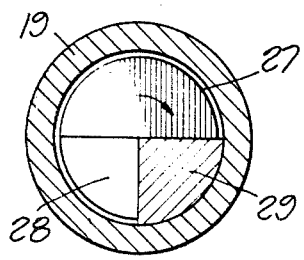
FIG. 4 is a transverse sectional view taken substantially on the lines 4—4 as shown in FIG. 2.
Figure 5:
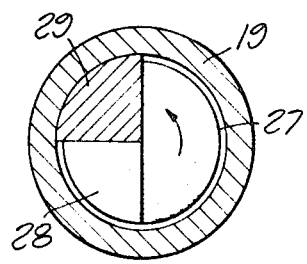
FIG. 5 is a transverse sectional view taken substantially on the lines 5—5 as shown in FIG. 3.

A projecting pilot 26 is provided on one end of the screw member 17 to facilitate insertion of the screw member 17 into the threaded insert 12. On the other end of the screw member 17 there is provided an integral flange 27 positioned within the cavity 21. This flange is provided with an integral upstanding lug 28 which cooperates with a similar integral lug 29 depending from the bar 18. The proportions of the cooperating lugs 28 and 29 are such that they provide an angular lost-motion connection between the shank member 16 and the screw member 17. Thus as shown in the drawings the screw member 17 and its flange 27 may freely turn approximately one-half revolution with respect to the bar 18 which forms a part of the shank member 16. FIGS. 2 and 4 show the cooperating lugs 28 and 29 at one of their extreme positions, and FIGS. 3 and 5 show the lugs at the other of their extreme positions.

In operation, the threaded bushing or insert 12 is held in a stationary position while the screw member 17 is threaded into its internal threads 14. The relative turning motion is achieved by turning the shank member 16 in a direction to bring the external threads 24 of the screw member 18 into engagement with the internal threads 14 in the insert 12. Assuming that the threads are all right-hand, the cooperating lugs 28 and 29 occupy the relative position shown in FIG. 4 during the initial operation of engaging the screw 17 within the insert 12. The end 31 of the insert comes to rest against the end surface 23 of the shank member 16.

The tool 15 is then moved to bring the insert 12 into alignment with the threaded opening 11 in the workpiece 10, and the shank member 16 is rotated to engage the external threads 13 of the insert into the threaded opening 11. Continued rotation brings the parts to the position shown in FIG. 2, with the end surface 23 engaging the surface 32 on the workpiece 10. This brings the end 31 of the insert 12 in flush relationship with the surface 32 of the workpiece 10.

Rotation of the shank member 16 is then reversed. The angular lost-motion connection provided by the cooperating lugs 28 and 29 permits the shank member 16 to turn freely for substantially one-half revolution before the lugs initiate turning movement of the screw member 17. Resistance to turning of the insert 12 within the threaded opening 11 is enhanced by the friction plug 12a. During this one-half revolution, the end surface 23 moves away from the end 31 of the insert 12 and away from the surface 32 of the work piece 10, developing a clearance space shown at 33 in FIG. 3. Continued reverse-turning movement of the shank member 16 serves to disconnect the screw member 17 from the internal threads 14 of the insert 12, leaving the insert in place in the workpiece 10.

I claim

1. In a tool for installing an insert into an internally threaded opening in a workpiece, the insert having coaxial internal and external threads, the tool comprising, in combination: a shank member having an end surface shaped for end-to-end contact with the insert, a screw member threadedly mounted coaxially of the shank member and projecting through said end surface for engagement with the internal threads of the insert having a single continuous screw thread for engaging said insert and for threadedly mounting said screw member to said shank member, and interengaging lugs on the members providing an angular lost-motion connection between them, whereby after installation of the insert into the workpiece by turning the shank member in one direction, reverse turning movement of the shank member relative to the screw member within the angular limit permitted by the lost-motion connection causes axial separation of the end surface and the insert.